US012713502B2

(12) United States Patent
Hu

(10) Patent No.: US 12,713,502 B2
(45) Date of Patent: Aug. 18, 2026

(54) ELECTRIC HEATING TEMPERATURE CONTROL APPARATUS AND ELECTRIC HEATING DEVICE

(71) Applicant: SHENZHEN COSYLAND ELECTRONIC CO., LTD., Shenzhen (CN)

(72) Inventor: Shaobang Hu, Shenzhen (CN)

(73) Assignee: SHENZHEN COSYLAND ELECTRONIC CO., LTD., Shenzhen (CN)

( * ) Notice: Subject to any disclaimer, the term of this patent is extended or adjusted under 35 U.S.C. 154(b) by 783 days.

(21) Appl. No.: 18/125,814

(22) Filed: Mar. 24, 2023

(65) Prior Publication Data

US 2023/0413386 A1 Dec. 21, 2023

(30) Foreign Application Priority Data

Jun. 17, 2022 (CN) ......................... 202210690010.7
Feb. 16, 2023 (CN) ......................... 202310165998.X

(51) Int. Cl.
*H05B 3/00* (2006.01)
*H05B 1/02* (2006.01)

(52) U.S. Cl.
CPC ......... *H05B 3/0019* (2013.01); *H05B 1/0225* (2013.01); *H05B 2203/017* (2013.01); *H05B 2203/035* (2013.01)

(58) Field of Classification Search
CPC .. H05B 3/0019; H05B 1/0225; H05B 1/0272; H05B 2203/017; H05B 2203/035
See application file for complete search history.

(56) References Cited

U.S. PATENT DOCUMENTS

2010/0193503 A1* 8/2010 Kim ......................... H05B 3/56 219/494
2017/0006663 A1 1/2017 Nomura et al.
2023/0036804 A1* 2/2023 Zhou .................... H05B 1/0272

FOREIGN PATENT DOCUMENTS

CN 103197711 B 5/2015
CN 204462905 U 7/2015
(Continued)

OTHER PUBLICATIONS

Search Report issued in European Patent Application No. 23165085.4; Application Filing Date Mar. 29, 2023; Date of Mailing Nov. 30, 2023 (7 pages).

*Primary Examiner* — Elton K Wong
(74) *Attorney, Agent, or Firm* — CANTOR COLBURN LLP

(57) ABSTRACT

An electric heating temperature control apparatus and an electric heating device are provided. The electric heating temperature control apparatus is connected with an external electric heating wire including a temperature sensing conductor, an insulating layer and a heating conductor, and includes a temperature detecting circuit including a temperature sensing voltage dividing and sampling unit, an AC voltage dividing and sampling unit and a differential signal processing unit, the AC voltage dividing and sampling unit is used for converting an input signal of the AC power supply into a reference voltage signal, the temperature sensing voltage dividing and sampling unit is used for converting a signal flowing through the temperature sensing conductor into a temperature voltage signal, and the differential signal processing unit is used for performing a differential comparison between the temperature voltage signal and the reference voltage signal. The electric heating device includes the electric heating temperature control apparatus.

20 Claims, 6 Drawing Sheets

(56) References Cited

FOREIGN PATENT DOCUMENTS

| | | | |
|---|---|---|---|
| CN | 111796614 | A | 10/2020 |
| CN | 112013985 | A | 12/2020 |
| EP | 1036486 | B1 | 7/2002 |
| JP | H0638195 | U | 5/1994 |
| WO | 9930535 | A1 | 6/1999 |

* cited by examiner

ELECTRIC HEATING TEMPERATURE CONTROL APPARATUS AND ELECTRIC HEATING DEVICE

CROSS-REFERENCE TO RELATED APPLICATIONS

This disclosure claims the benefit of Chinese Patent Application No. 202210690010.7 filed on Jun. 17, 2022 and Chinese Patent Application No. 202310165998.X filed on Feb. 16, 2023, the entire contents each of which are incorporated herein by reference.

TECHNICAL FIELD

The present disclosure relates to the technical field of temperature control, and more particularly, relates to an electric heating temperature control apparatus and electric heating device.

BACKGROUND

At present, there are many types of electric heating products such as traditional heating pads and electric blankets at home and abroad, and there are also many corresponding types of temperature control circuits. Imperfection of the temperature control apparatus of the existing electric blankets results in some problems with the existing electric blankets, for example, a local wrinkle of an electric blanket may cause local overheating during use, thus shortening the service life of the electric blanket, and even endangering the personal and property safety of the user; for another example, the lack or imprecision of temperature detection may affect the comfort of users; for another example, the safety protection is not comprehensive, and when some components in a circuit are damaged and fail and cause an electric blanket to continue to heat up, there is no reliable safety protection circuit, which seriously affects the safety.

To solve the problem of local overheating during use caused by a local wrinkle, WO1999030535A1 discloses an electric heating wire, which consists of two conductors and a temperature sensing layer of a Negative Temperature Characteristic (NTC) (hereinafter referred to as a NTC layer) between the two conductors, in which one conductor has a positive resistance characteristic (PTC) (hereinafter referred to as PCT conductor). The existing control circuit uses the NTC layer to detect the localized hot spot and provide overheat protection, and uses the PTC conductor to detect the overall temperature. Theoretically this may prevent the local overheating during use caused by a local wrinkle of an electric blanket and realize high-precision temperature detections and temperature control. But the temperature detections of existing NTC layers may have a margin of error of plus/minus 30%, besides, the temperature coefficient of the NTC layer may change as the electric blanket ages with time. Further, when an existing temperature control circuit detects the temperature through the PTC conductor, current leakage may exist between the PTC conductor and the NTC layer, and the unstable leakage current between the PTC conductor and the NTC layer will seriously affect the precision of the temperature detections. In addition, due to the voltage fluctuation of the AC power supply, the existing temperature control circuit may not perform precise temperature detections.

Therefore, how to realize precise temperature detections and provide temperature control with safety protection in cases where the temperature is out of control due to circuit failure or where improper use causes local or overall overheating are urgent problems to be solved.

SUMMARY

This disclosure provides an electric heating temperature control apparatus and electric heating device, to solve the technical problem of imprecise temperature detections of existing electric heating temperature control apparatus.

A first aspect of the embodiments of this disclosure provides an electric heating temperature control apparatus using an AC power supply and connected with an external electric heating wire, the electric heating wire comprises a temperature sensing conductor, an insulating layer and a heating conductor, the temperature sensing conductor is used at least for sensing a temperature of the heating conductor, the insulating layer is used for insulation between the conductors, and the insulating layer can change its resistance or result in a short circuit between the conductors when a local or overall temperature of the heating conductor changes, and the heating conductor is used at least for heating, the electric heating temperature control apparatus comprises: a temperature detecting circuit, a heating switching circuit and a temperature parameter setting circuit; the temperature detecting circuit comprises a temperature sensing voltage dividing and sampling unit, an AC voltage dividing and sampling unit and a differential signal processing unit; a first terminal of the temperature sensing voltage dividing and sampling unit is connected to a second terminal of the temperature sensing conductor, a first terminal of the temperature sensing conductor is connected to a live wire of the AC power supply, a second terminal of the temperature sensing voltage dividing and sampling unit is grounded, an output terminal of the temperature sensing voltage dividing and sampling unit is connected to the differential signal processing unit, and the temperature sensing voltage dividing and sampling unit is used for converting a signal flowing through the temperature sensing conductor into a temperature voltage signal and output it to the differential signal processing unit; a first terminal of the AC voltage dividing and sampling unit is connected to the live wire of the AC power supply, a second terminal of the AC voltage dividing and sampling unit is grounded, an output terminal of the AC voltage dividing and sampling unit is connected to the differential signal processing unit, and the AC voltage dividing and sampling unit is used for converting an input signal of the AC power supply into a reference voltage signal and output it to the differential signal processing unit; the differential signal processing unit is used for performing a differential comparison between the temperature voltage signal and the reference voltage signal for identification, so as to avoid the voltage variation of the AC power supply from affecting the precision of temperature detection, and to judge the temperature of the temperature sensing conductor and output a stop-heating signal or a heating signal; the heating switching circuit is connected to the temperature detecting circuit and to the heating conductor, and is used for turning off a power supply circuit of the heating conductor when receiving the stop-heating signal, and turning on the power supply circuit of the heating conductor when receiving the heating signal, so as to control the heating conductor to heat or to stop heating; the temperature parameter setting circuit is connected to the temperature detecting circuit for setting a temperature parameter.

In one of the embodiments, the electric heating temperature control apparatus further comprises: a safety protection circuit, which is connected to the heating switching circuit and to the heating conductor, the safety protection circuit uses a characteristic that the insulating layer can change its resistance or result in a short circuit between the conductors when a local or overall temperature of the insulating layer changes, to detect the local or overall temperature of the heating conductor by detecting a leakage current through the insulating layer, and outputting an abnormality signal to control the heating switching circuit to turn off the power supply circuit of the heating conductor when the temperature is higher than a preset safety value.

In one of the embodiments, the heating switching circuit comprises a first switch unit and a second switch unit; a first terminal of the first switch unit is connected to the live wire of the AC power supply or to the second terminal of the temperature sensing conductor, a second terminal of the first switch unit is connected to a first terminal of the heating conductor, a first terminal of the second switch unit is connected to the second terminal of the heating conductor, and a second terminal of the second switch unit is grounded or equivalently grounded; when the first switch unit and the second switch unit are on, the power supply circuit of the heating conductor is turned on; when the first switch unit or the second switch unit is off, the power supply circuit of the heating conductor is turned off; when the first switch unit and the second switch unit are off, heating currents at both terminals of the heating conductor are cut off, to allow the safety protection circuit to detect the leakage current more precisely and the temperature detecting circuit to detect the temperature of the temperature sensing conductor more precisely.

In one of the embodiments, the safety protection circuit is also used for outputting the abnormality signal in cases where the temperature detecting circuit works abnormally or the heating switching circuit works abnormally, to control the heating switching circuit to turn off the power supply circuit of the heating conductor.

In one of the embodiments, the heating switching circuit comprises a first switch unit and a second switch unit; the temperature sensing voltage dividing and sampling unit comprises a first resistor and a second resistor, a first terminal of the first resistor is connected to the second terminal of the temperature sensing conductor directly or through a diode, a second terminal of the first resistor is connected to a first terminal of the second resistor, a second terminal of the second resistor is grounded, a series connection node of the first resistor and the second resistor serves as the output terminal of the temperature sensing voltage dividing and sampling unit to be connected to the differential signal processing unit; or, the temperature sensing voltage dividing and sampling unit comprises a second resistor, the first terminal of the heating conductor is connected to the second terminal of the temperature sensing conductor through the first switch unit, a second terminal of the heating conductor is connected to a first terminal of the second resistance through the second switch unit, a second terminal of the second resistor is grounded, and the first terminal of the second resistance also serves as the output terminal of the temperature sensing voltage dividing and sampling unit to be connected to the differential signal processing unit; the AC voltage dividing and sampling unit comprises a third resistor and a fourth resistor, a first terminal of the third resistor is connected to the live wire of the AC power supply directly or through a diode, a second terminal of the third resistor is connected to a first terminal of the fourth resistor, a second terminal of the fourth resistor is grounded, and a series connection node of the third resistor and the fourth resistor serves as the output terminal of the AC voltage dividing and sampling unit to be connected to the differential signal processing unit; the diodes used in the temperature sensing voltage dividing and sampling unit and in the AC voltage dividing and sampling unit are both used for simultaneously intercepting a positive half cycle or a negative half cycle of a voltage of the AC power supply for voltage division and sampling.

In one of the embodiments, the differential signal processing unit comprises a first voltage comparator and a second voltage comparator, a first input terminal of the first voltage comparator is connected to the output terminal of the temperature sensing voltage dividing and sampling unit, a second input terminal of the first voltage comparator is connected to the output terminal of the AC voltage dividing and sampling unit, an output terminal of the first voltage comparator is connected to a second input terminal of the second voltage comparator, a first input terminal of the second voltage comparator is connected to a voltage source, and an output terminal of the second voltage comparator is connected to the heating switching circuit; or, the differential signal processing unit comprises a third voltage comparator and a single-chip microcomputer, a first input terminal of the third voltage comparator is connected to the output terminal of the temperature sensing voltage dividing and sampling unit, a second input terminal of the third voltage comparator is connected to the output terminal of the AC voltage dividing and sampling unit, an output terminal of the third voltage comparator is connected to the single-chip microcomputer, and the single-chip microcomputer is also connected to the heating switching circuit; or, the differential signal processing unit comprises a single-chip microcomputer, the output terminal of the temperature sensing voltage dividing and sampling unit is connected to a first A/D converter port of the single-chip microcomputer, the output terminal of the AC voltage dividing and sampling unit is connected to a second A/D converter port of the single-chip microcomputer, and the single-chip microcomputer is also connected to the heating switching circuit.

In one of the embodiments, the safety protection circuit comprises a safety signal sampling unit and a safety signal processing unit; a first terminal of the safety signal sampling unit is connected to a second terminal of the heating conductor, a second terminal of the safety signal sampling unit is grounded or connected to a voltage terminal of an power circuit, and the safety signal sampling unit is used for converting a current signal passing therethrough into a safety voltage signal and output it to the safety signal processing unit; the safety signal processing unit is connected to the heating switching circuit, and the safety signal processing unit performs abnormality analysis and judgment according to a received abnormality judgment sequence and the safety voltage signal, and outputs an abnormality signal to the heating switching circuit when an abnormality exists; the heating switching circuit is also connected to the safety signal processing unit, and the heating switching circuit is also used for turning off the power supply circuit of the heating conductor when receiving the abnormality signal.

In one of the embodiments, the electric heating temperature control apparatus further comprises: a timing power-off temperature measurement circuit, used for directly or indirectly controlling the heating switching circuit to force a turning off the heating for a period of time after each heating duration, such that the electric heating temperature control apparatus performs a temperature detection when the heating switching circuit turns off the heating, thus avoiding a leakage current from being generated by the AC power supply through the heating conductor and the insulating layer to the temperature sensing conductor and affecting the precision of temperature detections.

In one of the embodiments, the temperature detecting circuit performs a temperature detection during a positive half cycle of the AC power supply, and the safety protection circuit performs an abnormality detection during a negative half cycle of the AC power supply; or the temperature detecting circuit performs a temperature detection during a negative half cycle of the AC power supply, and the safety protection circuit performs an abnormality detection during a positive half cycle of the AC power supply; such that the temperature detecting circuit and the safety protection circuit does not conflict with each other during operations.

A second aspect of this disclosure provides an electric heating device comprising the electric heating temperature control apparatus according to any one of the above embodiments.

Compared with the existing techniques, the embodiments of this disclosure has the following benefits: the voltage variation of the AC power supply and the error variation of the working voltage of the temperature sensing conductor may be avoided, the affection to the precision of the detection of the temperature sensing conductor may be decreased, the precision of the sensed temperature variation of the temperature sensing conductor may be enhanced, high-precision temperature detections of the temperature detecting circuit are realized, precise temperature detections are realized and the technical problem of imprecise temperature detections of existing electric heating temperature control apparatus is solved.

DETAILED DESCRIPTION OF THE EMBODIMENTS

Figure 1:
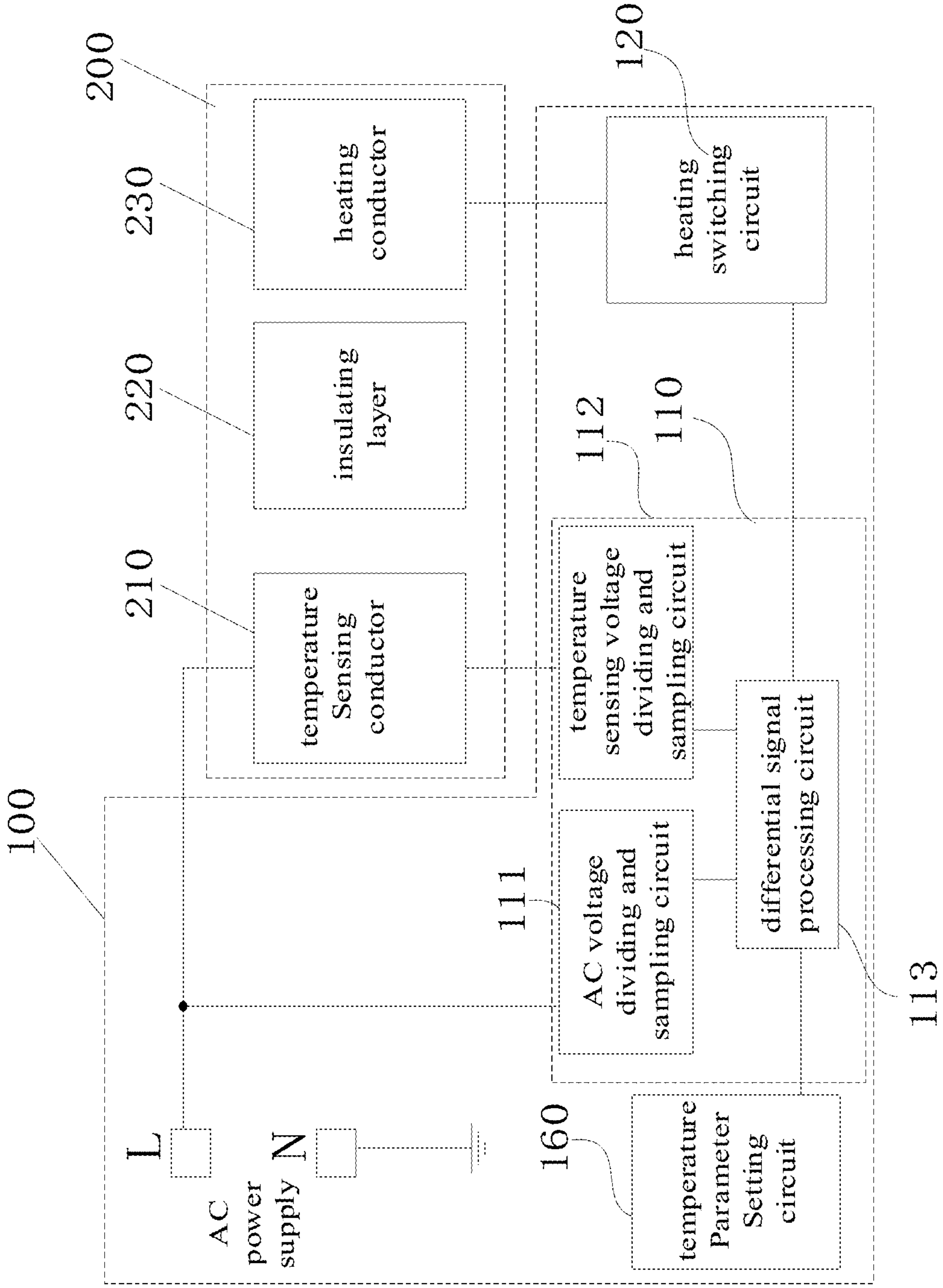
FIG. 1 is a principal diagram of an electric heating temperature control apparatus provided in one embodiment of this disclosure.

In order to make the technical problems, technical solutions and advantages of this disclosure clearer, this disclosure will be further described in detail below with reference to the accompanying drawings and embodiments. It should be understood that the specific embodiments described herein are merely illustrative of this disclosure and are not intended to limit this disclosure.

It should be noted that when an element is referred to as being "fixed to" or "provided at" another element, it may be on the other element directly or indirectly. When an element is referred to as being "coupled to" to another element, it may be connected to the other element directly or indirectly.

It should be understood that an orientation or positional relationship indicated by the terms "length", "width", "up", "down", "front", "back", "left", "right", "vertical", "horizontal", "top", "bottom", "inside", "outside" and the like is an orientation or positional relationship shown in the drawings, and is merely for the convenience of describing this disclosure and simplifying the description, rather than indicating or implying that the device or elements referred to have a particular orientation, and are configured and operated along a particular orientation. Thus, it cannot be construed as limiting this disclosure.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of one or more of such features. In the description of this disclosure, "a plurality of" means two or more, unless otherwise limited definitely and specifically.

A first aspect of the embodiments of this disclosure provides an electric heating temperature control apparatus 100, as shown in FIG. 1. The electric heating temperature control apparatus 100 uses an alternating current (AC) power supply, and is connected with an external electric heating wire 200. The electric heating wire 200 includes a temperature sensing conductor 210, an insulating layer 220 and a heating conductor 230, in which the temperature sensing conductor 210 is at least used for sensing the temperature of the heating conductor 230. The temperature sensing conductor 210 may be made of a conductor with a positive temperature coefficient (PTC). The insulating layer 220 may also be used for insulation between the temperature sensing conductor 210 and the heating conductor 230. Further, in case where local or overall temperature varies, the resistance of the insulating layer 220 may change or the insulating layer 220 may form a short circuit between the conductors. The heating conductor 230 is at least used for heating. Referring to FIG. 1, the electric heating temperature control apparatus 100 includes a temperature detecting circuit 110, a heating switching circuit 120 and a temperature parameter setting circuit 160.

The temperature detecting circuit 110 includes an AC voltage dividing and sampling unit 111, a temperature sensing voltage dividing and sampling unit 112 and a differential signal processing unit 113.

The first terminal of the temperature sensing voltage dividing and sampling unit 112 is connected to the second terminal of the temperature sensing conductor 210, the first terminal of the temperature sensing conductor 210 is connected to the live wire L of the AC power supply, the second terminal of the temperature sensing voltage dividing and sampling unit 112 is grounded, the output terminal of the temperature sensing voltage dividing and sampling unit 112 is connected to the differential signal processing unit 113, and the temperature sensing voltage dividing and sampling unit 112 is used for converting a signal passing through the temperature sensing conductor 210 into a temperature voltage signal and output it to the differential signal processing unit 113.

The first terminal of the AC voltage dividing and sampling unit 111 is connected to the live wire L of the AC power supply, the second terminal of the AC voltage dividing and sampling unit 111 is grounded, the output terminal of the AC voltage dividing and sampling unit 111 is connected to the differential signal processing unit 113, and the AC voltage dividing and sampling unit 111 is used for converting an input signal of the AC power supply into a reference voltage signal and output it to the differential signal processing unit 113.

The differential signal processing unit 113 is used for performing a differential comparison between the temperature voltage signal and the reference voltage signal for identification process, so as to prevent the voltage variation of the AC power supply from affecting the precision of temperature detections, and determine the temperature of the temperature sensing conductor 210 and output a stop-heating signal or a heating signal.

The heating switching circuit 120 is connected to the temperature detecting circuit 110 and to the heating conductor 230. The heating switching circuit 120 is used for turning off the power supply circuit of the heating conductor 230 when receiving the stop-heating signal, and turning on the power supply circuit of the heating conductor 230 when receiving the heating signal.

The temperature parameter setting circuit 160 is connected to the differential signal processing unit 113, and used for setting a temperature parameter. Specifically, the temperature parameter setting circuit 160 sets the temperature parameter of the temperature sensing conductor 210 by adjusting the reference voltage signal output by the AC voltage dividing and sampling unit 111, and adjusts the temperature parameter by changing the potential of the reference voltage signal. In some embodiments, the temperature parameter setting circuit 160 may be realized with an adjustable resistor. In some embodiments, the temperature parameter setting circuit 160 may be realized with a button and a resistor in combination. In some other embodiments, the temperature parameter setting circuit 160 may be realized wirelessly with infrared, Bluetooth, and etc.

The first aspect of the embodiments of this disclosure provides an electric heating temperature control apparatus 100. Through the AC voltage dividing and sampling unit 111, the temperature sensing voltage dividing and sampling unit 112 and the differential signal processing unit 113 of the temperature detecting circuit 110, the electric heating temperature control apparatus 100 performs a differential comparison between the temperature voltage signal and the reference voltage signal for identification process, and may suppress the voltage variation of the AC power supply and the error variation of the working voltage of the temperature sensing conductor 210, reduce their impact on the detection precision of the temperature sensing conductor 210, improve the precision of the temperature sensing conductor 210 sensing the temperature variations, realize high-precision temperature detections of the temperature detecting circuit 110, and solve the problem of imprecise temperature detections of existing electric heating apparatus.

Figure 2:
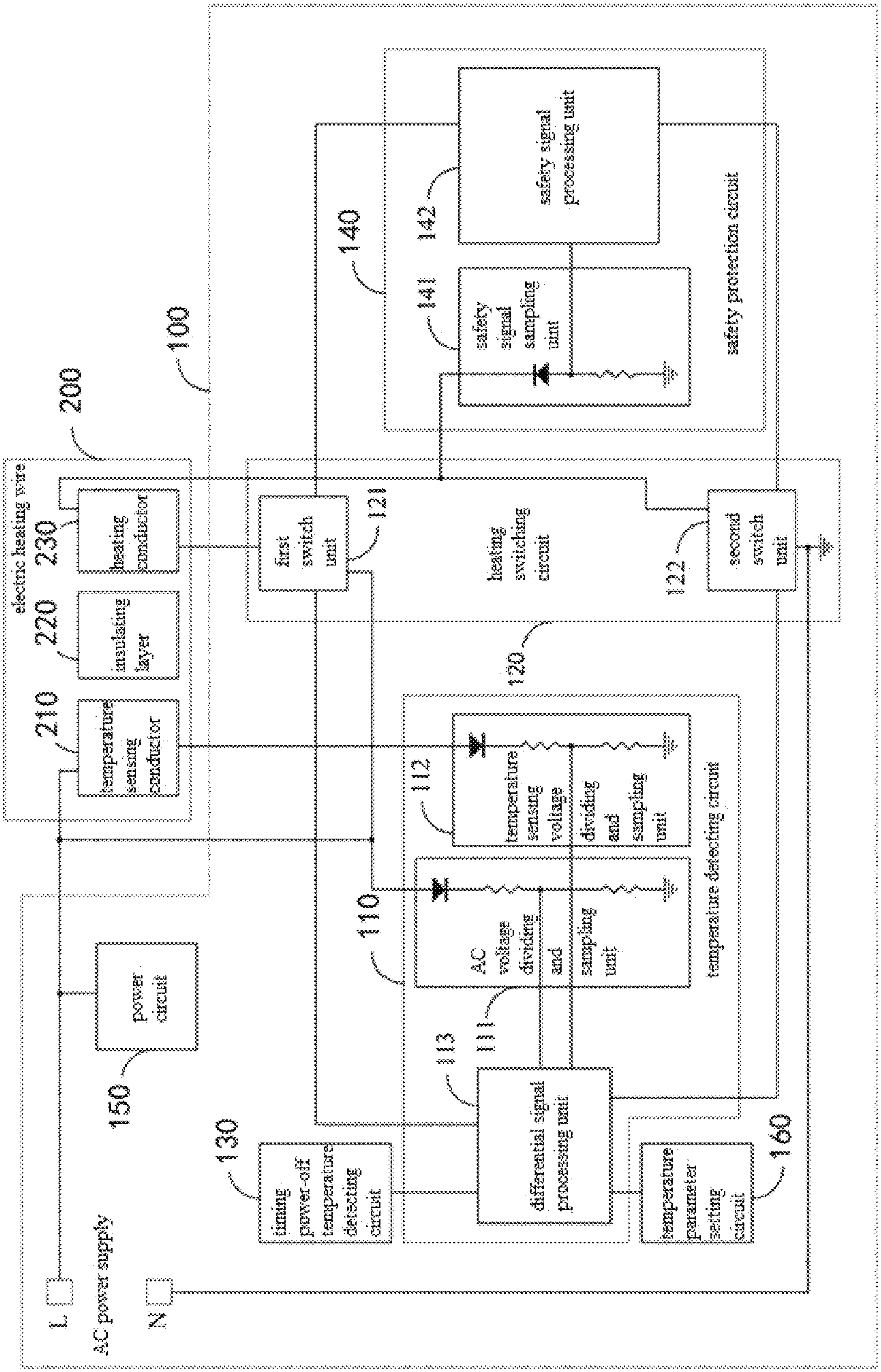
FIG. 2 is a principal diagram of an electric heating temperature control apparatus provided in another embodiment of this disclosure.

Please refer to FIG. 2. In one of the embodiments, the electric heating temperature control apparatus 100 also includes a timing power-off temperature detecting circuit 130, which is connected to the temperature detecting circuit 110 and used for directly or indirectly controlling the heating switching circuit 120 to force the turning off of the heating for a certain period of time after each heating duration. By using the heating switching circuit 120, the electric heating temperature control apparatus 100 may detect the temperature when the heating is turned off, so as to avoid a leakage current being generated by the AC power supply from the heating conductor 230 and the insulating layer 220 to the temperature sensing conductor 210 and thereby affecting the precision of temperature detections.

Please refer to FIG. 2. In one of the embodiments, the electric heating temperature control apparatus 100 also includes a safety protection circuit 140, which is connected to the heating switching circuit 120 and to the heating conductor 230. By utilizing the characteristic that the resistance of the insulating layer 220 may change or the insulating layer 220 may form a short circuit between the conductors in case where local or overall temperature varies, the safety protection circuit 140 detects the local or overall temperature of the heating conductor 230 by detecting the leakage current of the insulating layer 220, and output an abnormality signal when the temperature is greater than a preset safety value, and the safety protection circuit 140 controls the heating switching circuit 120 to turn off the power supply circuit of the heating conductor 230.

Please refer to FIG. 2. In one of the embodiments, specifically, the heating switching circuit 120 includes a first switch unit 121 and a second switch unit 122. The first terminal of the first switch unit 121 is connected to the live wire L of the AC power supply or to the second terminal of the temperature sensing conductor 210, the second terminal of the first switch unit 121 is connected to the first terminal of the heating conductor 230, that is, the current input terminal of the heating conductor 230, the first terminal of the second switch unit 122 is connected to the second terminal of the heating conductor 230, that is, the current output terminal of the heating conductor 230, and the second terminal of the second switch unit 122 is grounded or equivalently grounded.

When the first switch unit 121 and the second switch unit 122 are on, the power supply circuit of the heating conductor 230 is turned on. When the first switch unit 121 or the second switch unit 122 is off, the power supply circuit of the heating conductor 230 is turned off. When the first switch unit 121 and the second switch unit 122 are off, the heating current at both terminals of the heating conductor 230 is cut off, so that the safety protection circuit 140 may detect the leakage current of the insulating layer 220 more precisely, and so that the temperature detecting circuit 110 detects the temperature of the temperature sensing conductor 210 more precisely.

Please refer to FIG. 2. In one of the embodiments, the safety protection circuit 140 is also used for outputting an abnormality signal to a heating switch control circuit 12 when the temperature detecting circuit 110 is operating abnormally or the heating switching circuit 120 is operating abnormally, to control the heating switching circuit 120 to turn off the power supply circuit of the heating conductor 230. Referring to FIG. 2, for example, when the first switch unit 121 or the second switch unit 122 is continuously on due to the abnormal operation of the temperature detection circuit 110 and the abnormal operation of the heating switch circuit 120, an abnormality signal is output to control the heating switching circuit 120 to turn off the power supply circuit of the heating conductor 230.

Please refer to FIG. 2. Further, in one of the embodiments, the electric heating temperature control apparatus 100 also includes a power circuit 150, which is connected to the AC power supply. The power circuit 150 is used for converting the voltage of the AC power supply into a DC voltage to provide a DC voltage source required for the operation of the temperature detecting circuit 110 and the safety protection circuit 140.

Figure 3:
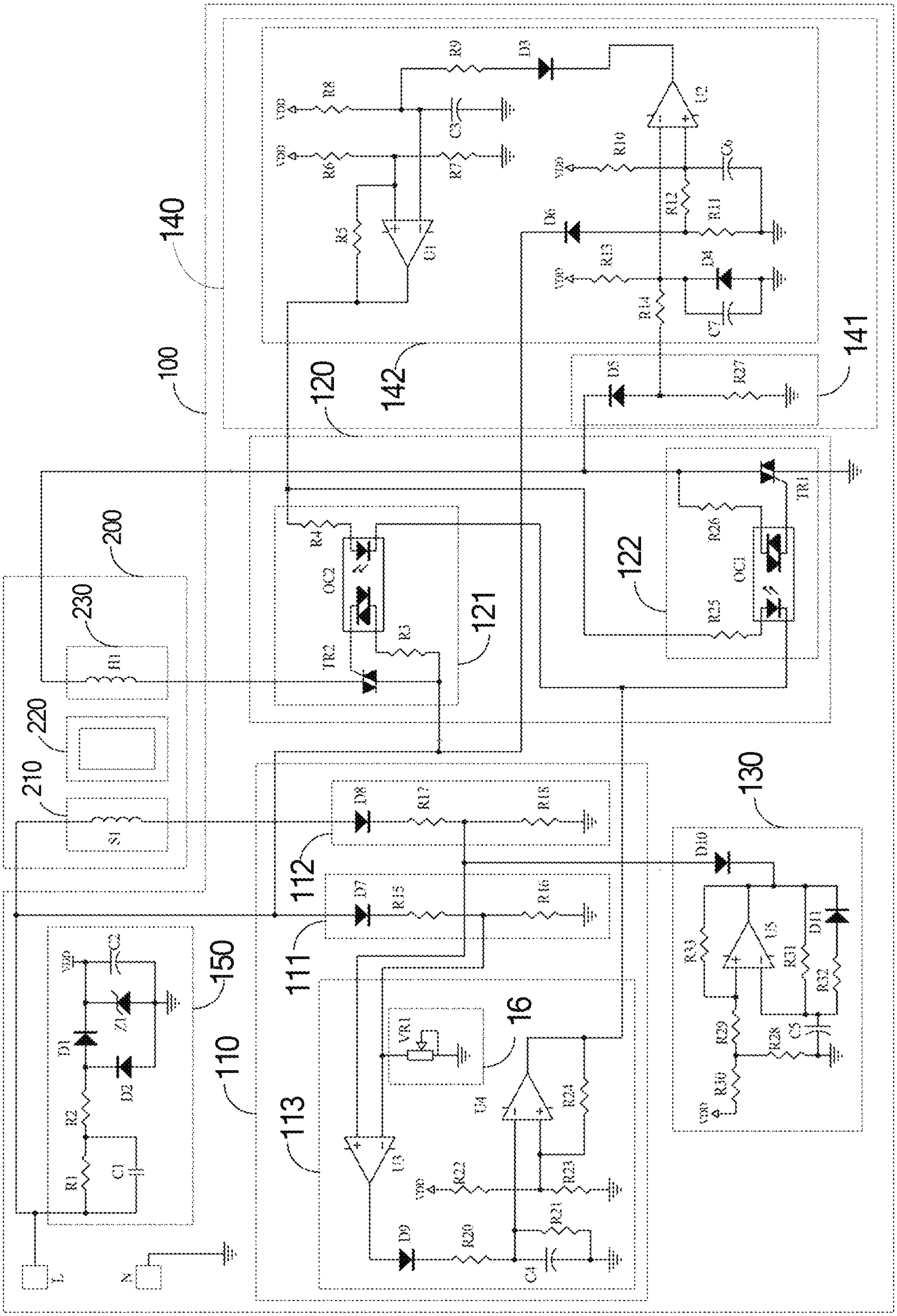
FIG. 3 is a principal circuit diagram of an electric heating temperature control apparatus provided in one embodiment of this disclosure.

Further, referring to FIG. 3, in one of the embodiments, the temperature sensing voltage dividing and sampling unit 112 includes a first resistor R17 and a second resistor R18. The first terminal of the first resistor R17 is connected to the second terminal of the temperature sensing conductor 210 through a diode D8, that is, the first terminal of the first resistor R17 is connected to the cathode of the diode D8, and the anode of the diode D8 is connected to the second terminal of the temperature sensing conductor 210; or the first terminal of the first resistor R17 is directly connected to the second terminal of the temperature sensing conductor 210, the second terminal of the first resistor R17 is connected to the first terminal of the second resistor R18, the second terminal of the second resistor R18 is grounded, and the series connection node of the first resistor R17 and the second resistor R18 serves as the output terminal of the temperature sensing voltage dividing and sampling unit 112 to be connected to the differential signal processing unit 113.

Referring to FIG. 3, the AC voltage dividing and sampling unit 111 includes a third resistor R15 and a fourth resistor R16. The first terminal of the third resistor R15 is connected to the live wire of the AC power supply via a diode D7, that is, the first terminal of the third resistor R15 is connected to the cathode of the diode D7, the anode of the diode D7 is connected to the live wire of the AC power supply; or the first terminal of the third resistor R15 is directly connected to the live wire of the AC power supply, the second terminal of the third resistor R15 is connected to the first terminal of the fourth resistor R16, the second terminal of the fourth resistor R16 is grounded, and the series connection node of the third resistor R15 and the fourth resistor R16 serves as the output terminal of the AC voltage dividing and sampling unit 111 to be connected to the differential signal processing unit 113.

It should be understood that the diodes D7 and D8 used in the temperature sensing voltage dividing and sampling unit 112 and in the AC voltage dividing and sampling unit 111 are both used for simultaneously intercepting the positive half cycle or the negative half cycle of the voltage of the AC power supply for voltage dividing and sampling.

Alternatively, referring to FIG. 3, the differential signal processing unit 113 includes a first voltage comparator U3 and a second voltage comparator U4. The first input terminal, i.e., the non-inverting input terminal, of the first voltage comparator U3 is connected to the output terminal of the temperature sensing voltage dividing and sampling unit 112, the second input terminal, i.e., the inverting input terminal, of the first voltage comparator U3 is connected to the output terminal of the AC voltage dividing and sampling unit 111, the output terminal of the first voltage comparator U3 is connected to the second input terminal of the second voltage comparator U4 through the diode D9 and the resistor R20, the first input terminal of the second voltage comparator U4 is connected to the power supply VDD through the resistor R22, and the output terminal of the second voltage comparator U4 is connected to the heating switching circuit 120.

Figure 4:
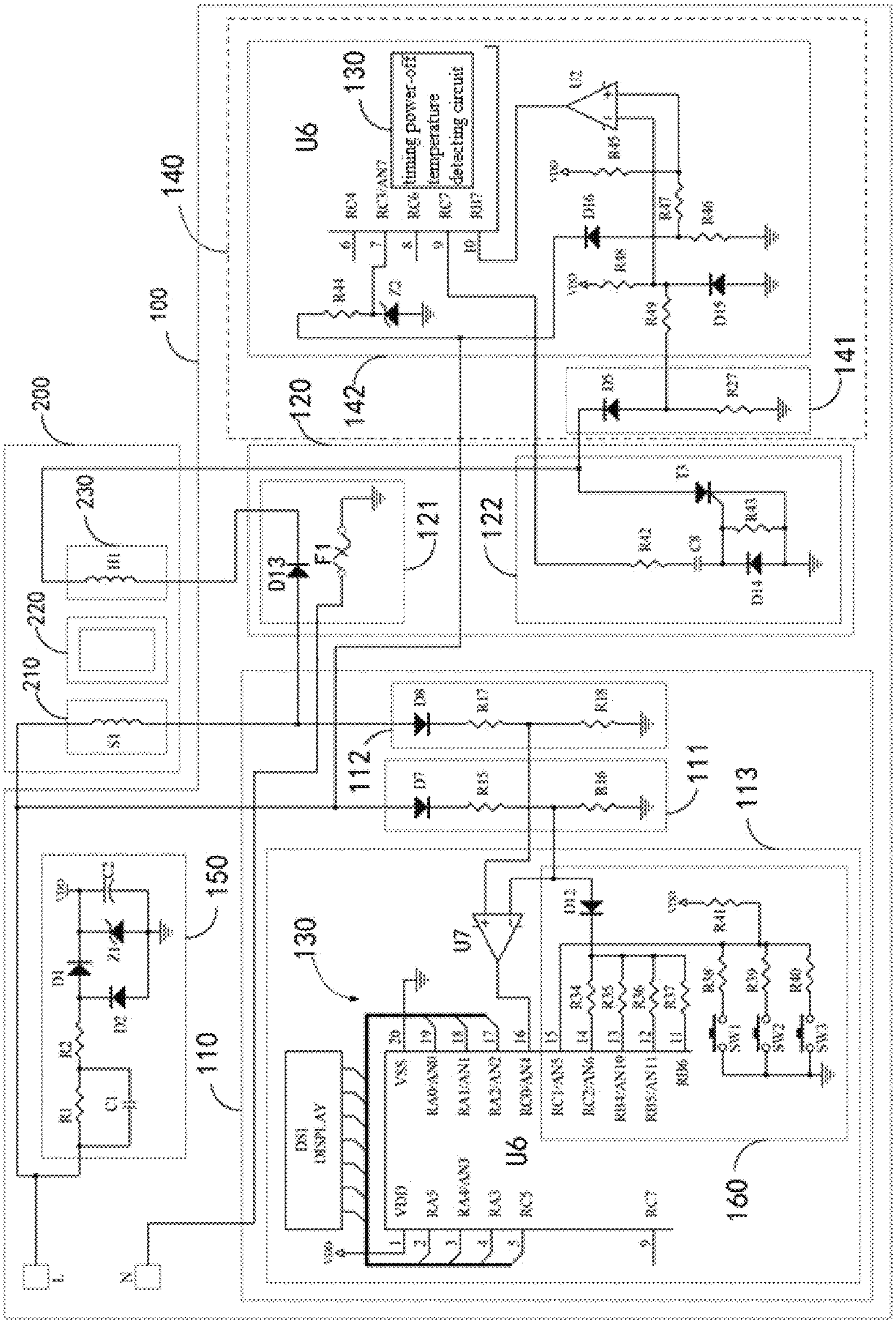
FIG. 4 is a principal circuit diagram of an electric heating temperature control apparatus provided in anther embodiment of this disclosure.

Alternatively, referring to FIG. 4, the differential signal processing unit 113 includes a third voltage comparator U7 and a single-chip microcomputer U6. The first input terminal of the third voltage comparator U7 is connected to the output terminal of the temperature sensing voltage dividing and sampling unit 112, the second input terminal of the third voltage comparator U7 is connected to the output terminal of the AC voltage dividing and sampling unit 111, the output terminal of the third voltage comparator U7 is connected to the single-chip microcomputer U6, and the single-chip microcomputer U6 is also connected to the heating switching circuit 120.

Figure 5:
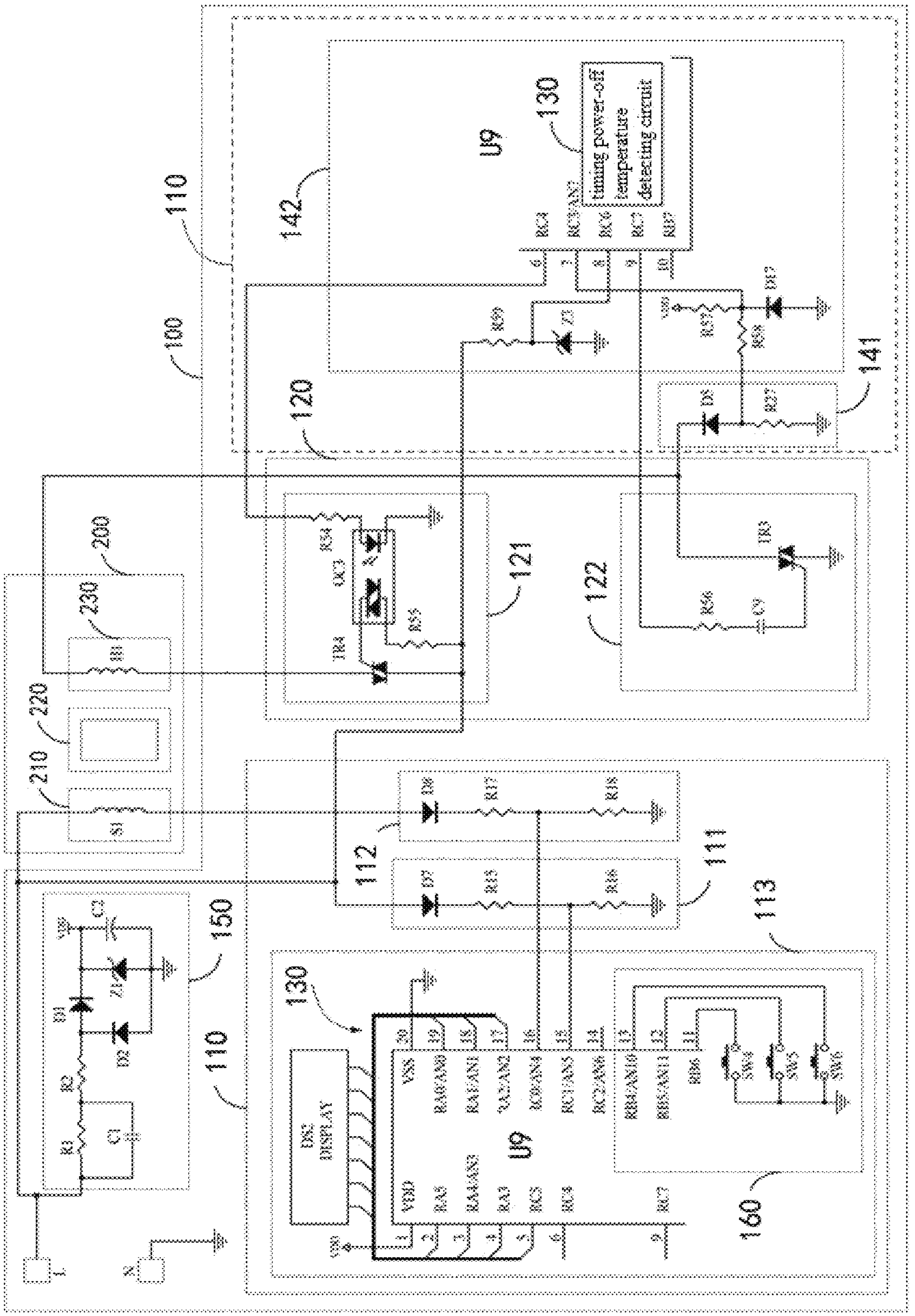
FIG. 5 is a principal circuit diagram of an electric heating temperature control apparatus provided in another embodiment of this disclosure.

Alternatively, referring to FIG. 5, the differential signal processing unit 113 includes a single-chip microcomputer U9. The output terminal of the temperature sensing voltage dividing and sampling unit 112 is connected to the first A/D converter port, i.e., the 16$^{th}$ pinout of the single-chip microcomputer U9, the output terminal of the AC voltage dividing and sampling unit 111 is connected to the second A/D converter port, i.e., the 15$^{th}$ pinout of the single-chip microcomputer U9, and the single-chip microcomputer U9 is also connected to the heating switching circuit 120.

Please refer to FIG. 2. Specifically, in one of the embodiments, the safety protection circuit 140 includes a safety signal sampling unit 141 and a safety signal processing unit 142. The first terminal of the safety signal sampling unit 141 is connected to the second terminal of the heating conductor 230, the second terminal of the safety signal sampling unit 141 is grounded or connected to the voltage output terminal of the power circuit 150, and the safety signal sampling unit 141 is used for converting a current signal flowing therethrough into a safety voltage signal and output it to the safety signal processing unit 142.

The safety signal processing unit 142 is connected to the heating switching circuit 120. The safety signal processing unit 142 performs abnormality analysis and judgment according to a received abnormality judgment sequence and the safety voltage signal. When abnormality exists, the safety signal processing unit 142 outputs an abnormality signal to the heating switching circuit 120. In one embodiment, referring to FIG. 2, the abnormality judgment sequence is provided by the timing power-off temperature detecting circuit 130, for example.

The heating switching circuit 120 is also connected to the safety signal processing unit 142, and the heating switching circuit 120 is also used for turning off the power supply circuit of the heating conductor 230 when receiving the abnormality signal.

Please refer to FIG. 2. Specifically, in one of the embodiments, the temperature detecting circuit 110 performs the temperature detection during the positive half cycle of the AC power supply, and the safety protection circuit 140 performs the abnormality detection during the negative half cycle of the AC power supply; or the temperature detecting circuit 110 performs the temperature detection during the negative half cycle of the AC power supply, and the safety protection circuit 140 performs the abnormality detection during the positive half cycle of the AC power supply. This may avoid conflicts between the operations of the temperature detecting circuit 110 and the safety protection circuit 140, further improve the stability of the operation of the electric heating temperature control apparatus 100 of this disclosure.

It should be understood that the neutral wire N of the AC power supply is grounded in this embodiment, therefore the ground terminal mentioned in this embodiment may be a reference ground based on the potential of the neutral wire N of the AC power supply.

FIG. 1 and FIG. 2 are the principal block diagrams of the circuits implemented in the embodiments of the present application, and the specific implementation details are shown in FIG. 3, which is an implemented circuit diagram in the embodiments of this disclosure.

Referring to FIG. 3, the AC voltage dividing and sampling unit 111 includes the second diode D7, the third resistor R15 and the fourth resistor R16. The anode of the second diode D7 is connected to the live wire L of the AC power supply, the cathode of the second diode D7 is connected to one terminal of the third resistor R15, the other terminal of R15 is connected to one terminal of the fourth resistor R16, and the other terminal of the fourth resistor R16 is grounded, in which the series connection node of the third resistor R15 and the fourth resistor R16 serves as the output terminal of the AC voltage dividing and sampling unit 111 to be connected to the differential signal processing unit 113.

Please refer to FIG. 3. The temperature sensing voltage dividing and sampling unit 112 includes the first diode D8, the first resistor R17 and the second resistor R18. The anode of the first diode D8 is connected to the current output terminal (i.e., the second terminal) of the temperature sensing conductor 210, the cathode of the second diode D8 is connected to the first terminal of the first resistor R17, the second terminal of R17 is connected to the first terminal of the second resistor R18, and the second terminal of the second resistor R18 is grounded, in which the series connection node of the first resistor R17 and the second resistor R18 serves as the output terminal of the temperature sensing voltage dividing and sampling unit 112 to be connected to the differential signal processing unit 113.

Please refer to FIG. 3. The differential signal processing unit 113 includes the first voltage comparator U3 and the second voltage comparator U4. The first input terminal of the first voltage comparator U3 is connected to the output terminal of the temperature sensing voltage dividing and sampling unit 112, the second input terminal of the first voltage comparator U3 is connected to the output terminal of the AC voltage diving and sampling unit 111, the output terminal of the first voltage comparator U3 is connected to the second input terminal of the second voltage comparator U4 through the diode D9 and the resistor R20, the first input terminal of the second voltage comparator U4 is connected to the power supply VDD through the resistor R22, one terminal of the resistor R23 is grounded, the other terminal of the resistor R23 is connected to the first input terminal of the second voltage comparator U4, the resistor R24 is connected between the first input terminal and the output terminal of the second voltage comparator U4, and the output terminal of the second voltage comparator U4 is connected to the heating switching circuit 120. The voltage comparison processing unit 1232 in this embodiment is realized with the first voltage comparator U3 and the second voltage comparator U4.

Please refer to FIG. 3. The temperature parameter setting circuit 160 is connected to the AC voltage dividing and sampling unit 111 for adjusting the reference voltage signal output by the AC voltage dividing and sampling unit 111 to set the temperature parameter of the temperature sensing conductor 210. The differential signal processing unit 113 is used for performing the differential comparison between the temperature voltage signal and the adjusted reference voltage signal for identification process.

Please refer to FIG. 3. The temperature parameter setting circuit 160 includes an adjustable resistor VR1. The first terminal of the adjustable resistor VR1 is connected to the output terminal of the AC voltage dividing and sampling unit 111, and the second terminal of the adjustable resistor VR1 is grounded. The adjustable resistor VR1 is used for adjusting the reference voltage signal output by the AC voltage dividing and sampling unit 111 to set the temperature parameter of the temperature sensing conductor 210.

The first input terminal of the first voltage comparator U3 is connected to the output terminal of the temperature sensing voltage dividing and sampling unit 112, the second input terminal of the first voltage comparator U3 is connected to the output terminal of the AC voltage dividing and sampling unit 111, the output terminal of the first voltage comparator U3 is connected to the second input terminal of the second voltage comparator U4 through the diode D9 and the resistor R20, the first input terminal of the second voltage comparator U4 is connected to the power supply VDD through the resistor R22, one terminal of the resistor R23 is grounded, the other terminal of the resistor R23 is connected to the first input terminal of the second voltage comparator U4, the resistor R24 is connected between the first input terminal and the output terminal of the second voltage comparator U4, and the output terminal of the second voltage comparator U4 is connected to the heating switching circuit 120 connections. The voltage comparison processing unit 1232 in this embodiment is realized with the first voltage comparator U3 and the second voltage comparator U4.

In this embodiment, the partial voltage variation at the resistor R18 caused by the temperature variation of the heating conductor 230 is a differential mode signal, which will be separated and put into the comparison, and the comparison result is output from the output terminal of the voltage comparator U3; if the voltage input at the first input terminal of the first voltage comparator U3 is lower than the voltage input at the second input terminal of the voltage comparator U3, it may be determined that the temperature is higher than the temperature set by the user, and the voltage comparator U3 outputs the stop-heating signal; otherwise, it may be determined that the temperature is lower than the temperature set by the user, and the output terminal of the voltage comparator U3 outputs the heating signal.

Referring to FIG. 3, the first switch unit 121 includes a first TRIAC TR2 and a first optocoupler OC2, and the second switch unit 122 includes a second TRIAC TR1 and a second optocoupler OC1. The first main electrode of the first TRIAC TR2 is connected to the live wire L of the AC power supply, the second main electrode of the first TRIAC TR2 is connected to the input terminal of the heating conductor 230, the control electrode of the first TRIAC TR2 is connected to the first output terminal of the second optocoupler OC1, the second output terminal of the first optocoupler OC2 is connected to the first main electrode of the first TRIAC TR2 through the resistor R3, and the first input terminal of the first optocoupler OC2 is connected to the safety protection circuit 140 through the resistor R4. The first main electrode of the second TRIAC TR1 is connected to the output terminal of the heating conductor 230, the second main electrode of the second TRIAC TR1 is grounded, the control electrode of the second TRIAC TR1 is connected to the first output terminal of the second optocoupler OC1, the second output terminal of the second optocoupler OC1 is connected to the first main electrode of the first TRIAC TR2 through the resistor R26, the first input terminal of the second optocoupler OC1 is connected to the temperature detecting circuit 110 through the resistor R25, and the second input terminal of the first optocoupler OC2 is connected to the second input terminal of the second optocoupler OC1.

Referring to FIG. 3, the timing power-off temperature detecting circuit 130 consists of a voltage comparator U5 and its peripheral elements, i.e., the resistor R28, the resistor R29, the resistor R30, the resistor R31, the resistor R32, the resistor R33, the capacitor C5, the diode D10, and the diode D11. The anode of the diode D10 is the signal output terminal of the timing power-off temperature detecting circuit 130 and is connected to the differential signal processing unit 113. The timing power-off temperature measurement circuit 130 may output a low-level voltage for a duration at regular intervals to force the temperature detecting circuit 110 to output the stop-heating signal, and provide the safety signal processing unit 142 with an abnormality judgment sequence for abnormality judgment. At the same time, the temperature detecting circuit 110 detects the temperature when the heating switching circuit 120 turns off the heating, so as to avoid a leakage current being generated by the AC power supply from the heating conductor 230 to the insulating layer 220 to the temperature sensing conductor 210 and thereby affecting the precision of temperature detections.

Referring to FIG. 3, the safety signal sampling unit 141 includes a diode D5 and a resistor R27. The cathode of the diode D5 is connected to the output terminal of the heating conductor 230, the anode of the diode D5 is connected to one terminal of the resistor R27, the other terminal of the resistor R27 is grounded, and the series connection node of the diode D5 and the resistor R27 serves as the output terminal of the safety signal sampling unit 141 to be connected to the safety signal processing unit 142. The diode D5 is used for allowing the safety signal sampling unit 141 to intercept the negative half cycle of the AC power supply for abnormality voltage sampling.

Specifically, referring to FIG. 3, the safety signal processing unit 142 realizes the identification process of the safety voltage signal output by the safety signal sampling unit 141 through a voltage comparator U2 and a voltage comparator U1. The safety signal processing unit 142 includes the voltage comparator U2 and an abnormality signal processor composed of its peripheral elements, i.e., the diode D6, the diode D4, the resistor R10, the resistor R11, the resistor R12, the resistor R13, the resistor R14, the capacitor C6, and the capacitor C7. The resistor R13 is connected in series with the resistor R14 and their connection node is connected to the second input terminal of the voltage comparator U2, the other terminal of the resistor R13 is connected to the voltage source VDD provided by the power circuit 150, the other terminal of the resistor R14 serves as the signal input terminal of the safety signal processing unit 142 to be connected to the signal output terminal of the safety signal sampling unit 141, the capacitor C7 is used for filtering, the diode D4 is used for overvoltage protection; the resistor R10, the resistor R11, the resistor R12, the diode D6 and the capacitor C6 form a structure, which is same as that at the second input terminal of the voltage comparator U2, to provide an abnormality reference voltage to the first input terminal of the voltage comparator U2, and the same structure may prevent the voltage variation of the AC power supply from affecting the precision of abnormality detection. When an abnormality occurs, the safety signal sampling unit 141 outputs a safety voltage signal to the second input terminal of the voltage comparator U2, to make the voltage comparator U2 to output a high-level voltage. The voltage comparator U1 and its peripheral elements, i.e., the resistor R5, the resistor R6, the resistor R7, the resistor R8 and capacitor C3, form a delay breaker, which may delay by a period of time to stop the heating after the voltage comparator U2 outputs the high-level voltage, so as to realize safety protection.

Please refer to FIG. 3. In one of the embodiments, the power circuit 150 consists of the resistor R1, the resistor R2, the capacitor C1, the capacitor C2, the diode D1, the diode D2, and the Zener diode Z1. The power circuit 150 is used for providing the working voltage source VDD required by all circuit elements. The specific connection of the power circuit 150 is not the focus of this disclosure and will not be specified here.

FIG. 4 is another implemented circuit diagram of the embodiments of this disclosure.

Please refer to FIG. 4. The temperature parameter setting circuit 160 includes a plurality of buttons, and the differential signal processing unit 113 includes a single-chip microcomputer U6 and a third voltage comparator U7. Among them, the plurality of buttons include the button SW1, the button SW2 and the button SW3. The first terminals of the button SW1, the button SW2 and the button SW3 are all grounded, and the second terminals of the button SW1, the button SW2 and the button SW3 are all connected to the 15$^{th}$ pinout of the single-chip microcomputer U6. The output terminal of the AC voltage dividing and sampling unit 111 is connected to the 16$^{th}$ pinout of the single-chip microcomputer U6 through the third voltage comparator U7, that is, the output terminal of the AC voltage dividing and sampling unit 111 is connected to the second input terminal of the third voltage comparator U7, the output terminal of the AC voltage dividing and sampling unit 111 is connected to the common terminal of the resistor R34, the resistor R35, the resistor R36 and the resistor R37 through the diode D12, and the other terminals of the resistor R34, the resistor R35, the resistor R36 and the resistor R37 are respectively connected to the 14$^{th}$ pinout, the 13$^{th}$ pinout, the 12$^{th}$ pinout and the 11$^{th}$ pinout of the single-chip microcomputer U6. By inputting the temperature parameter through the button SW1, the button SW2, and the button SW3, and then by outputting a voltage corresponding to the set temperature parameter through the 14$^{th}$ pinout, the 13$^{th}$ pinout, the 12$^{th}$ pinout and the 11$^{th}$ pinout of the single-chip microcomputer U6 and the resistor R34, the resistor R35, the resistor R36, the resistor R37 and the diode D12, the partial voltage at the fourth resistor R16 may be changed, and the reference voltage signal output by the AC voltage diving and sampling unit 111 may be adjusted to set the temperature parameter of the temperature sensing conductor 210.

The single-chip microcomputer U6 is also connected to the output terminal of the temperature sensing voltage dividing and sampling unit 112 and to the heating switching circuit 120. The single-chip microcomputer U6 is used for performing the differential comparison between the temperature voltage signal and the adjusted reference voltage signal for identification process. Further, referring to FIG. 4, a display DS1, such as a 1602 display screen, is included. The display DS1 may be used for displaying the setting information of the temperature parameter and the working status of the electric heating temperature control apparatus 100.

Please refer to FIG. 4. The first switch unit 121 includes the first diode D13 and the thermal fuse F1, and the second switch unit 122 includes the first unidirectional thyristor T3, the second diode D14, the resistor R42, the resistor R43 and the first capacitor C8.

The anode of the first diode D13 is connected to the second terminal of the temperature sensing conductor 210, the cathode of the first diode D13 is connected to the input terminal of the heating conductor 230, and the first diode D13 conducts during the positive half cycle of the AC power supply and does not conduct during the negative half cycle of the AC power supply. The first terminal of the thermal fuse F1 is connected to the neutral wire N of the AC power supply, the second terminal of the thermal fuse F1 is grounded, and the thermal fuse F1 is used for stopping the heating of the heating conductor 230 when it blows. In practical circuits, the thermal fuse F1 may be arranged next to the resistor R27 of the safety signal sampling unit 141, that is, the thermal fuse F1 is located close to the resistor R27. When the thermal fuse F1 blows, the heating may be turned off.

The anode of the first unidirectional thyristor T3 is connected to the output terminal of the heating conductor 230, and the cathode of the first unidirectional thyristor T3 is grounded. The resistor R42, the first capacitor C8 and the second diode D14 are connected in series between the temperature detecting circuit 110 and the ground. The anode of the second diode D14 is grounded, the control electrode of the first unidirectional thyristor T3 is connected to the cathode of the second diode D14, and the resistor R43 is connected in parallel with the second diode D14. Referring to FIG. 4, the resistor R42, the first capacitor C8 and the second diode D14 are connected in series between the $9^{th}$ pinout of the single-chip microcomputer U6 and the ground. The single-chip microcomputer U6 controls the on or off of the first unidirectional thyristor T3 to realize heating and stopping heating.

Please refer to FIG. 4. The timing power-off temperature detecting circuit 130 may be arranged in the single-chip microcomputer U6.

Please refer to FIG. 5. Further, the safety signal processing unit 142 includes a voltage comparator U2 and its peripheral elements, i.e., the diode D16, the diode D15, the resistor R45, the resistor R46, the resistor R47, the resistor R48, and the resistor R49. The resistor R48 is connected in series with the resistor R49, the series connection node of the resistor R48 and the resistor R49 is connected to the second input terminal of the voltage comparator U2, the other terminal of the resistor R48 is connected to the working voltage source VDD provided by the power circuit 150, and the other terminal of the resistor R49 serves as the input terminal of the safety signal processing unit 142 to be connected to the output terminal of the safety signal sampling unit 141. The diode D15 is used for overvoltage protection. The resistor R45, the resistor R46, the resistor R47 and the diode D16 form a structure, which is same as that at the second input terminal of the voltage comparator U2, to provide the abnormality reference voltage to the first input terminal of the voltage comparator U2, and the same structure may prevent the voltage variation of the AC power supply from affecting the precision of the abnormality detection.

In abnormal cases where the first switch unit 121 fails and is always on, or the insulating layer 220 detects abnormal local or overall overheating of the heating conductor 230, or the insulation of the insulating layer 220 is damaged and results in an abnormal short circuit between the conductors and etc., the safety signal sampling unit 141 outputs the sampled safety voltage signal to the second input terminal of the voltage comparator U2, so that the voltage comparator U2 outputs a high-level voltage. The safety signal processing unit 142 also includes the single-chip microcomputer U6 and the processing program inside the single-chip microcomputer U6. The safety signal processing unit 142 receives the voltage output by the voltage comparator U2 through the $10^{th}$ pinout of the single-chip microcomputer U6.

In this embodiment, the safety signal processing unit 142 identifies the abnormality in the following ways: after the voltage comparator U2 outputs a high-level voltage, if it can output a low-level voltage after the timing power-off temperature detecting circuit 130 forces the turning off of the heating, then it is determined that it is the turning on of the heating switching circuit 120 that causes the voltage comparator U2 to output the high-level voltage, and this conforms to the abnormality judgment sequence; after the voltage comparator U2 outputs a high-level voltage, if it still outputs the high-level voltage after the timing power-off temperature detecting circuit 130 forces the turning off of the heating, it is determined that it is abnormality that causes the voltage comparator U2 to output the high-level voltage, and this does not conform to the abnormality judgment sequence. The $9^{th}$ pinout of the single-chip microcomputer U6 outputs a stop-heating signal, and controls the second switch unit 122 to turn off the heating, so as to realize safety protection; when the second switch unit 122 fails and is always on, the temperature of the heating conductor 230 will increase, and when the overheated insulating layer 220 results in a relatively small resistance or a short circuit between the temperature sensing conductor 210 and the heating conductor 230, the resistor R27 will generate heat due to excessive current passing through, and because the thermal fuse F1 is arranged to be close to the resistor R27, the thermal fuse F1 will blow due to the heat generated by the resistor R27, thereby turning off the heating for safety protection.

Referring to FIG. 4, further, the safety signal processing unit 142 also includes the resistor R44, the Zener diode Z2, the single-chip microcomputer U6 and its internal zero-crossing detection program, which form an AC power zero-crossing detection unit, for detecting the zero-crossing point of the AC power supply, facilitating the single-chip microcomputer U6 to control the on-off time of the second switch unit 122, and facilitating the single-chip microcomputer U6 to control the time point for reading the temperature voltage value during the temperature detection or the time point for reading the abnormality voltage value during the abnormality detection.

Please refer to FIG. 4. Further, there is a program for the timing power-off temperature detection inside the single-chip microcomputer U6. This program may control the heating switching circuit 120 through the $9^{th}$ pinout of the single-chip microcomputer U6, to force the turning off of the heating for a period of time after each heating duration, so as to provide the abnormality judgment sequence to the safety signal processing unit 142 for abnormality judgment. At the same time, the temperature detecting circuit 110 detects the temperature when the heating switching circuit 120 turns off the heating, so as to avoid a leakage current being generated by the AC power supply through the heating conductor 230 to the insulating layer 220 or the temperature sensing conductor 210 and affecting the precision of temperature detections.

Please refer to FIG. 4. The temperature detecting circuit 110 adopts a single-chip microcomputer U6 and a third voltage comparator U7, to perform a voltage differential comparison between the temperature voltage signal output at the voltage dividing output terminal of temperature sensing voltage dividing and sampling unit 112 and the reference voltage signal output at the output terminal of the AC voltage dividing and sampling unit 111 for identification process, to prevent the voltage variation of the AC power supply and the error variation of the working voltage from affecting the precision of temperature detections. Besides, the temperature detecting circuit 110 performs temperature detections when the heating switching circuit 120 is turned off, so as to avoid a leakage current from being generated by the AC power supply to the heating conductor 210 and thus affecting the precision of temperature detections. By adopting the above-mentioned technical means, the temperature variation sensed by the temperature sensing conductor 210 may be accurately extracted, realizing high-precision temperature detections and temperature control. In addition, the safety protection circuit 140 uses the timing power-off temperature detecting circuit 130 to provide the safety signal processing unit 142 with an abnormality judgment sequence for abnormality judgment. When the first switch unit 121 fails and is always on, or the isolating layer 220 detects abnormal local or overall overheating of the heating conductor 230, or the insulation of the insulating layer 220 is damaged and results in an abnormal short circuit between the conductors, the safety protection circuit 140 judges whether there is an abnormality through the analysis of the safety signal processing unit 142 on whether the high-level or low-level voltage value output by the safety signal sampling unit 141 is normal or whether the occurrence time of the voltage value conforms to the abnormality judgment sequence. When there is an abnormality, the safety signal processing unit 142 outputs an abnormality signal to control the heating switching circuit 120 to turn off the heating, realizing the safety protection by rapid power-off. When the second switch unit 122 fails and is always on, the overheated heating conductor 230 results in a relatively small resistance or a short circuit between the temperature sensing conductor 210 and the heating conductor 230, the resistor R27 will generate heat due to excessive current passing through, and the thermal fuse F1 will blow due to the heat generated by the resistor R27, thereby realizing safety protection. The above solves the problems of imprecise temperature detections and insufficient safety protection of electric heating apparatus.

FIG. 5 is another implemented circuit diagram of the embodiments of this disclosure.

Please refer to FIG. 5. The temperature parameter setting circuit 160 includes a plurality of buttons, and the differential signal processing unit 113 includes a single-chip microcomputer U6. Among them, the plurality of buttons include the button SW4, the button SW5 and the button SW6. The first terminals of the button SW4, the button SW5 and the button SW6 are all grounded, and the second terminals of the button SW4, the button SW5 and the button SW6 are respectively connected to the $11^{th}$ pinout, the $12^{th}$ pinout and the $13^{th}$ pinout of single-chip microcomputer U9. The output terminal of the AC voltage dividing and sampling unit 111 is connected to the $15^{th}$ pinout of the single-chip microcomputer U9, and the output terminal of the temperature sensing voltage dividing and sampling unit 112 is connected to the $16^{th}$ pinout of the single-chip microcomputer U9. The temperature parameter setting program of the single-chip microcomputer U9 has been preset with different temperature parameter values, and users may set the temperature parameter through the buttons SW4, SW5, and SW6. A corresponding temperature parameter value may be extracted, and provided to the single-chip microcomputer U9 for the voltage differential comparison for identification process. The $9^{th}$ pinout of the single-chip microcomputer U9 is also connected to the heating switching circuit 120, and the single-chip microcomputer U9 may perform differential comparison between the temperature voltage signal and the adjusted reference voltage signal for identification process.

Further, referring to FIG. 4 or 5, a display DS2, such as a 1602 display screen, is included. The display DS2 may be used for displaying the setting information of the temperature parameter and the working status of the electric heating temperature control apparatus 100.

Referring to FIG. 5, the first switch unit 121 includes a third TRIAC TR4 and a third optocoupler OC3, and the second switch unit 122 includes a fourth TRIAC TR3, a resistor R56 and a second capacitor C9.

The first main electrode of the third TRIAC TR4 is connected to the live wire L of the AC power supply, the second main electrode of the third TRIAC TR4 is connected to the current input terminal of the heating conductor 230, the control electrode of the third TRIAC TR4 is connected to the first output terminal of the third optocoupler OC3, the second output terminal of the third optocoupler OC3 is connected to the first main electrode of the third TRIAC TR4, the first input terminal of the third optocoupler OC3 is connected to the safety protection circuit 140, and the second input terminal of the third optocoupler OC3 is grounded.

The first main electrode of the fourth TRIAC TR3 is connected to the current output terminal of the heating conductor 230, the second main electrode of the fourth TRIAC TR3 is grounded, the control electrode of the fourth TRIAC TR3 is connected to the first terminal of the second capacitor C9, the second terminal of the second capacitor C9 is connected to the first terminal of the resistor R56, and the second terminal of the resistor R56 is connected to temperature detecting circuit 110, that is, to the $9^{th}$ pinout of the single-chip microcomputer U9.

Referring to FIG. 5, the timing power-off temperature detecting circuit 130 may be arranged in the single-chip microcomputer U9.

Referring to FIG. 5, the safety signal processing unit 142 includes the single-chip microcomputer U9, the resistor R57, the resistor R58, and the diode D17. Among them, the resistor R57 is connected in series with the resistor R58, and the series connection node of the resistor R57 and the resistor R58 is connected to the $7^{th}$ pinout of the single-chip microcomputer U9. The other terminal of the resistor R57 is connected to the working voltage source VDD provided by the power circuit 150, and the other terminal of the resistor R58 serves as the input terminal of the safety signal processing unit 142 to be connected to the output terminal of the safety signal sampling unit 141. The diode D17 is used for overvoltage protection. The $7^{th}$ pinout of the single-chip microcomputer U9 is set as an analog-to-digital converter (A/D) channel. When the first switch unit 121 fails and is always on, or the second switch unit 122 fails and is always on, or the insulating layer 220 detects abnormal local or over overheating of the heating conductor 230, or the insulation of the insulating layer 220 is damaged and results in an abnormal short circuit between the conductors, the single-chip microcomputer U9 may read the highest peak voltage value in the above-mentioned abnormal cases, and convert the voltage value into an abnormality voltage value to be compared with the abnormality voltage values preset by the internal program of the single-chip microcomputer U9 for identification process. Then by combining with the abnormality judgment sequence provided by the timing power-off temperature detecting circuit 130, it may be judged which kind of abnormality exists. When there is an abnormality, the $6^{th}$ pinout and the $9^{th}$ pinout of the single-chip microcomputer U9 output the stop-heating signal to control the second switch unit 122 to turn off the heating, so as to realize safety protection. To improve the precision of abnormality detections, the single-chip microcomputer U9 judges the actual condition of the voltage of the AC power supply by reading the voltage value at the $15^{th}$ pinout, and corrects the preset abnormality voltage values according to the actual voltage of the AC power supply, so as to improve the precision of abnormality detections.

Please refer to FIG. 5. Specifically, the safety signal processing unit 142 also includes the resistor R59, the Zener diode Z3, the single-chip microcomputer U9 and its internal zero-crossing detection program, which form an AC power zero-crossing detection unit, for detecting the zero-crossing point of the AC power supply, facilitating the single-chip microcomputer U9 to control the on-off time of the second switch unit 122, and facilitating the single-chip microcomputer U9 to control the time point for reading the temperature voltage value during the temperature detection or the time point for reading the abnormality voltage value during the abnormality detection.

Please refer to FIG. 5. Specifically, the timing power-off temperature detecting circuit 130 is arranged in the single-chip microcomputer U9, and there is a program for the timing power-off temperature detection inside the single-chip microcomputer U9. This program may control the heating switching circuit 120 through the $6^{th}$ pinout and the $9^{th}$ pinout of the single-chip microcomputer U9, to force the heating switching circuit 120 to turn off the heating for a period of time after each heating duration when the heating switching circuit 120 is on, so as to provide the abnormality judgment sequence to the safety signal processing unit 142 for abnormality judgment. At the same time, the temperature detection circuit 110 detects the temperature when the heating switching circuit 120 turns off the heating, so as to avoid a leakage current being generated by the AC power supply through the heating conductor 230 to the insulating layer 220 or the temperature sensing conductor 210 and affecting the precision of temperature detections.

Referring to FIG. 5, in this embodiment, the temperature detecting circuit 110 adopts the single-chip microcomputer U9, to perform a voltage differential comparison between the temperature voltage signal output at the output terminal output of temperature sensing voltage dividing and sampling unit 112 and the reference voltage signal output at the output terminal of the AC voltage dividing and sampling unit 111 for identification process, to prevent the voltage variation of the AC power supply and the error variation of the working voltage from affecting the precision of temperature detections. Besides, and the single-chip microcomputer U9 performs temperature detections when the heating switching circuit 120 turns off the heating, so as to avoid a leakage current from being generated by the AC power supply to the temperature sensing conductor 210 and thus affecting the precision of temperature detections. By adopting the above-mentioned technical means, the temperature variation sensed by the temperature sensing conductor 210 may be accurately extracted, realizing high-precision temperature detections and temperature control.

In addition, the safety protection circuit 140 uses the timing power-off temperature detecting circuit 130 to provide the safety signal processing unit 142 with an abnormality judgment sequence for abnormality judgment. When the first switch unit 121 fails and is always on, or the isolating layer 220 detects abnormal local or overall overheating of the heating conductor 230, or the insulation of the insulating layer 220 is damaged and results in an abnormal short circuit between the conductors, the safety protection circuit 140 judges whether there is an abnormality through the analysis of the safety signal processing unit 142 on whether the high-level or low-level voltage value output by the safety signal sampling unit 141 is normal or whether the occurrence time of the voltage value conforms to the abnormality judgment sequence. When there is an abnormality, the safety signal processing unit 142 outputs an abnormality signal to control the heating switching circuit 120 to turn off the heating, realizing the safety protection by rapid power-off. When the second switch unit 122 fails and is always on, the overheated heating conductor 230 results in a relatively small resistance or a short circuit between the temperature sensing conductor 210 and the heating conductor 230, the resistor R27 will generate heat due to excessive current passing through, and the thermal fuse F1 will blow due to the heat generated by the resistor R27, thereby realizing safety protection. The above solves the problems of imprecise temperature detections and insufficient safety protection of electric heating apparatus.

Figure 6:
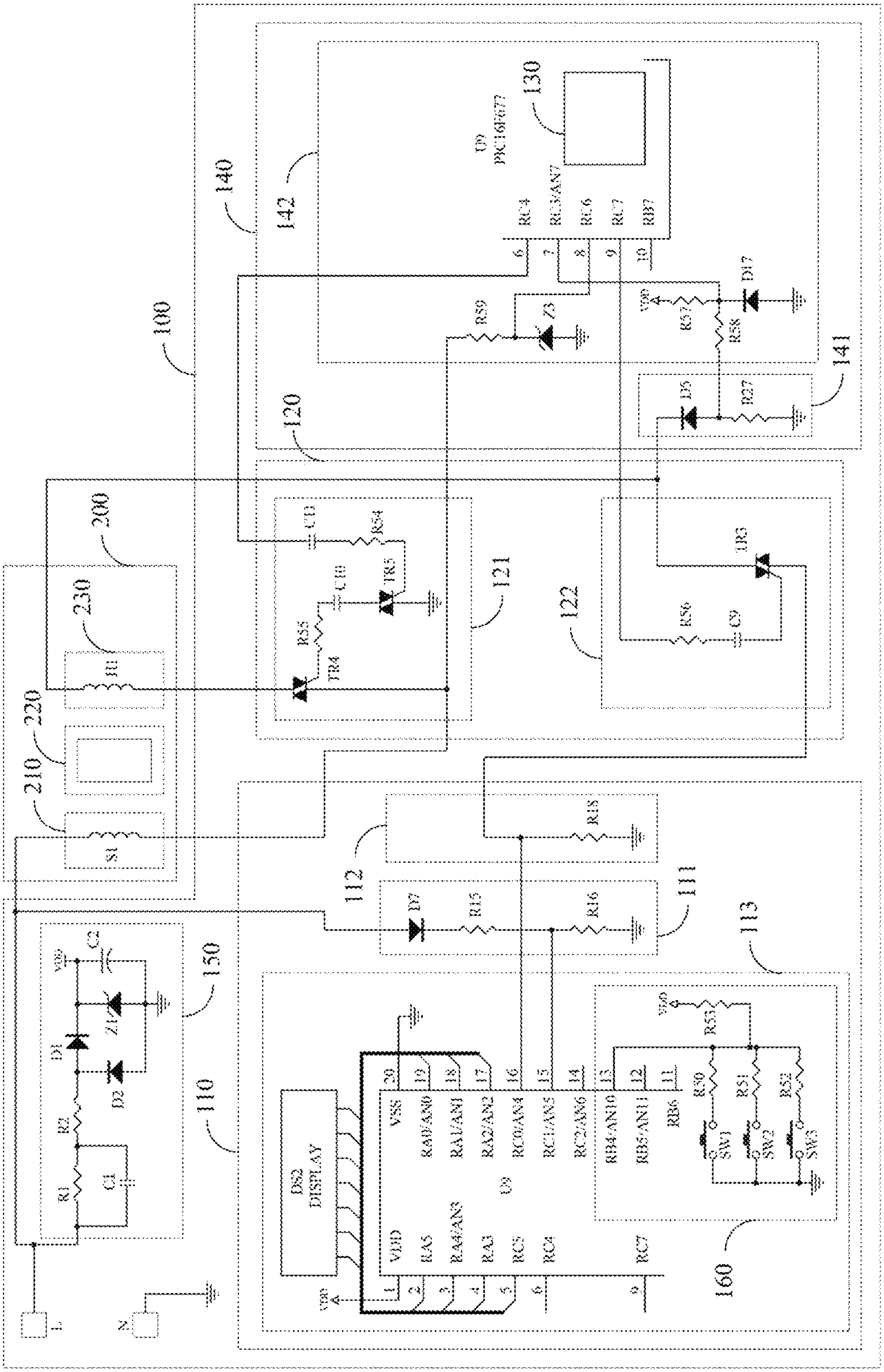
FIG. 6 is a principal circuit diagram of an electric heating temperature control apparatus provided in another embodiment of this disclosure.

Please refer to FIG. 6. In one embodiment, the heating switching circuit 120 includes the first switch unit 121 and the second switch unit 122. The temperature sensing voltage dividing and sampling unit 112 includes the second resistor R18. The first terminal of the temperature sensing conductor 210 is connected to the first terminal of the live wire L of the AC power supply, the second terminal of the temperature sensing conductor 210 is connected to the first terminal of the heating conductor 230 through the first switch unit 121, the second terminal of the heating conductor 230 is connected to the first terminal of the second resistor R18 through the second switch unit 122, the second terminal of the second resistor R18 is grounded, and the first terminal of the second resistor R18 serves as the output terminal of the temperature sensing voltage dividing and sampling unit 112 to be connected to the differential signal processing unit 113. Among them, the series connection position of the second resistor R18 may be adjusted according to actual needs, for example, the second resistor R18 may also be connected in series between the second terminal of the heating conductor 230 and the first terminal of the second switch unit 122, and the second terminal of the second switch unit 122 is grounded. After changing the series connection position of the second resistor R18, one only needs to adaptively adjust the resistance of each resistor in the temperature detecting circuit 110.

It should be noted that, in this embodiment, the temperature sensing conductor 210 and the heating conductor 230 may be used for both heating and temperature sensing. It is possible to simultaneously monitor the temperatures of the temperature sensing conductor 210 and of the heating conductor 230, through the detections on the currents flowing through the temperature sensing conductor 210 and through the heating conductor 230 by the temperature sensing voltage dividing and sampling unit 112.

Referring to FIG. 6, in one embodiment, the first switch unit 121 includes the third TRIAC TR4 and the fifth TRIAC TR5.

The second main electrode of the third TRIAC TR4 is connected to the second terminal of the temperature sensing conductor 210, the first main electrode of the third TRIAC TR4 is connected to the first terminal of the heating conductor 230, the control electrode of the third TRIAC TR4 is connected to the first main electrode of the fifth TRIAC TR5 through the resistor R55 and the capacitor C10, the second main electrode of the fifth TRIAC TR5 is grounded, and the control electrode of the fifth TRIAC TR5 is connected to the temperature detecting circuit 110, that is, the $6^{th}$ pinout of the single-chip microcomputer U9, through the resistor R54 and the capacitor C11.

The second aspect of the embodiments of this disclosure provides an electric heating device. The electric heating device includes the electric heating temperature control apparatus 100 provided in the first aspect of the embodiments of this disclosure. The electric heating device is, for example, an electric blanket, a heating pad, an electric tubular heater, among others.

The above embodiments are merely for illustrating the technical solutions of this disclosure, rather than limiting them; although this disclosure has been described in detail with reference to the foregoing embodiments, those of ordinary skill in the art should understand that it is still possible to modify the technical solutions recited in the foregoing embodiments, or equivalently replace some of the technical features; and these modifications or replacements do not make the essence of the corresponding technical solutions deviate from the spirit and scope of the technical solutions of the various embodiments of this disclosure, and should be included in the protection scope of this disclosure.

The invention claimed is:

1. An electric heating temperature control apparatus, using an AC power supply and connectable to an electric heating wire, the electric heating wire comprising a temperature sensing conductor, an insulating layer and a heating conductor, the temperature sensing conductor being configured for sensing a temperature of the heating conductor, the insulating layer being configured for insulation between the heating conductor and the temperature sensing conductor, and the insulating layer being configured for changing its resistance or resulting in a short circuit between the temperature sensing conductor and the heating conductor when a local or overall temperature of the heating conductor changes, and the heating conductor being configured for heating;

wherein the electric heating temperature control apparatus comprises a temperature detecting circuit, a heating switching circuit and a temperature parameter setting circuit;

the temperature detecting circuit comprises a temperature sensing voltage dividing and sampling unit, an AC voltage dividing and sampling unit and a differential signal processing unit;

a first terminal of the temperature sensing voltage dividing and sampling unit is connectable to a second terminal of the temperature sensing conductor, a first terminal of the temperature sensing conductor is connectable to a live wire of the AC power supply, a second terminal of the temperature sensing voltage dividing and sampling unit is grounded, an output terminal of the temperature sensing voltage dividing and sampling unit is connected to the differential signal processing unit, and the temperature sensing voltage dividing and sampling unit is configured for converting a signal flowing through the temperature sensing conductor into a temperature voltage signal and output it to the differential signal processing unit;

a first terminal of the AC voltage dividing and sampling unit is connected to the live wire of the AC power supply, a second terminal of the AC voltage dividing and sampling unit is grounded, an output terminal of the AC voltage dividing and sampling unit is connected to the differential signal processing unit, and the AC voltage dividing and sampling unit is configured for converting an input signal of the AC power supply into a reference voltage signal and output it to the differential signal processing unit;

the differential signal processing unit is configured for performing a differential comparison between the temperature voltage signal and the reference voltage signal and outputting a stop-heating signal or a heating signal according to the differential comparison between the temperature voltage signal and the reference voltage signal;

the heating switching circuit is connected to the temperature detecting circuit and is connectable to the heating conductor, and is configured for turning off a power supply circuit of the heating conductor when receiving the stop-heating signal, and turning on the power supply circuit of the heating conductor when receiving the heating signal, so as to control the heating conductor to heat or to stop heating; and the temperature parameter setting circuit is connected to the temperature detecting circuit for setting a temperature parameter.

2. The electric heating temperature control apparatus according to claim 1, further comprising:

a safety protection circuit connected to the heating switching circuit and is connectable to the heating conductor, wherein the safety protection circuit is configured for detecting the local or overall temperature of the heating conductor by detecting a leakage current through the insulating layer caused by a change of the resistance of the insulating layer or by the short circuit, and outputting an abnormality signal to control the heating switching circuit to turn off the power supply circuit of the heating conductor when the temperature is higher than a preset safety value.

3. The electric heating temperature control apparatus according to claim 2, wherein the heating switching circuit comprises a first switch unit and a second switch unit;

a first terminal of the first switch unit is connected to the live wire of the AC power supply or the first terminal of the first switch unit is connectable to the second terminal of the temperature sensing conductor, a second terminal of the first switch unit is connectable to a first terminal of the heating conductor, a first terminal of the second switch unit is connectable to a second terminal of the heating conductor, and a second terminal of the second switch unit is grounded or equivalently grounded;

the power supply circuit of the heating conductor is configured to be turned on when the first switch unit and the second switch unit are on;

the power supply circuit of the heating conductor is configured to be turned off when the first switch unit or the second switch unit is off; and heating currents at both terminals of the heating conductor are configured to be cut off when the first switch unit and the second switch unit are off.

4. The electric heating temperature control apparatus according to claim 2, wherein the safety protection circuit is further configured for outputting the abnormality signal in cases where the temperature detecting circuit works abnormally or the heating switching circuit works abnormally, to control the heating switching circuit to turn off the power supply circuit of the heating conductor.

5. The electric heating temperature control apparatus according to claim 2, wherein the safety protection circuit comprises a safety signal sampling unit and a safety signal processing unit;

wherein a first terminal of the safety signal sampling unit is connectable to a second terminal of the heating conductor, a second terminal of the safety signal sampling unit is grounded or connected to a voltage terminal of a power circuit, and the safety signal sampling unit is configured for converting a current signal passing therethrough into a safety voltage signal and output it to the safety signal processing unit;

the safety signal processing unit is connected to the heating switching circuit, and the safety signal processing unit performs abnormality analysis and judgment according to a received abnormality judgment sequence and the safety voltage signal, and outputs an abnormality signal to the heating switching circuit when an abnormality exists; and the heating switching circuit is also connected to the safety signal processing unit, and the heating switching circuit is also configured for turning off the power supply circuit of the heating conductor when receiving the abnormality signal.

6. The electric heating temperature control apparatus according to claim 2, wherein:

the temperature detecting circuit performs a temperature detection during a positive half cycle of the AC power supply, and the safety protection circuit performs an abnormality detection during a negative half cycle of the AC power supply; or the temperature detecting circuit performs a temperature detection during a negative half cycle of the AC power supply, and the safety protection circuit performs an abnormality detection during a positive half cycle of the AC power supply.

7. The electric heating temperature control apparatus according to claim 1, wherein the heating switching circuit comprises a first switch unit and a second switch unit; and the temperature sensing voltage dividing and sampling unit comprises a first resistor and a second resistor, wherein a first terminal of the first resistor is connectable to the second terminal of the temperature sensing conductor directly or through a first diode, a second terminal of the first resistor is connected to a first terminal of the second resistor, a second terminal of the second resistor is grounded, a series connection node of the first resistor and the second resistor serves as the output terminal of the temperature sensing voltage dividing and sampling unit to be connected to the differential signal processing unit;

the AC voltage dividing and sampling unit comprises a third resistor and a fourth resistor, a first terminal of the third resistor is connected to the live wire of the AC power supply directly or through a second diode, a second terminal of the third resistor is connected to a first terminal of the fourth resistor, a second terminal of the fourth resistor is grounded, and a series connection node of the third resistor and the fourth resistor serves as the output terminal of the AC voltage dividing and sampling unit to be connected to the differential signal processing unit; and the first and second diodes are connected such that they simultaneously intercept a positive half cycle or a negative half cycle of a voltage of the AC power supply for voltage division and sampling.

8. The electric heating temperature control apparatus according to claim 1, wherein the heating switching circuit comprises a first switch unit and a second switch unit; and the temperature sensing voltage dividing and sampling unit comprises a second resistor, wherein a first terminal of the heating conductor is connectable to the second terminal of the temperature sensing conductor through the first switch unit, a second terminal of the heating conductor is connectable to a first terminal of the second resistor through the second switch unit, a second terminal of the second resistor is grounded, and the first terminal of the second resistor also serves as the output terminal of the temperature sensing voltage dividing and sampling unit to be connected to the differential signal processing unit; and the AC voltage dividing and sampling unit comprises a third resistor and a fourth resistor, a first terminal of the third resistor is connected to the live wire of the AC power supply directly or through a diode, a second terminal of the third resistor is connected to a first terminal of the fourth resistor, a second terminal of the fourth resistor is grounded, and a series connection node of the third resistor and the fourth resistor serves as the output terminal of the AC voltage dividing and sampling unit to be connected to the differential signal processing unit.

9. The electric heating temperature control apparatus according to claim 1, wherein:

the differential signal processing unit comprises a first voltage comparator and a second voltage comparator, wherein a first input terminal of the first voltage comparator is connected to the output terminal of the temperature sensing voltage dividing and sampling unit, a second input terminal of the first voltage comparator is connected to the output terminal of the AC voltage dividing and sampling unit, an output terminal of the first voltage comparator is connected to a second input terminal of the second voltage comparator, a first input terminal of the second voltage comparator is connected to a voltage source, and an output terminal of the second voltage comparator is connected to the heating switching circuit.

10. The electric heating temperature control apparatus according to claim 1, wherein:

the differential signal processing unit comprises a third voltage comparator and a single-chip microcomputer, wherein a first input terminal of the third voltage comparator is connected to the output terminal of the temperature sensing voltage dividing and sampling unit, a second input terminal of the third voltage comparator is connected to the output terminal of the AC voltage dividing and sampling unit, an output terminal of the third voltage comparator is connected to the single-chip microcomputer, and the single-chip microcomputer is also connected to the heating switching circuit.

11. The electric heating temperature control apparatus according to claim 1, wherein:

the differential signal processing unit comprises a single-chip microcomputer, wherein the output terminal of the temperature sensing voltage dividing and sampling unit is connected to a first A/D converter port of the single-chip microcomputer, the output terminal of the AC voltage dividing and sampling unit is connected to a second A/D converter port of the single-chip microcomputer, and the single-chip microcomputer is also connected to the heating switching circuit.

12. The electric heating temperature control apparatus according to claim 1, further comprising:

a timing power-off temperature measurement circuit, configured for directly or indirectly controlling the heating switching circuit to force a turning off the heating for a period of time after each heating duration, such that the temperature detecting circuit performs a temperature detection when the heating switching circuit turns off the heating.

13. An electric heating device, comprising:

an electric heating wire, comprising:

a temperature sensing conductor, an insulating layer, and a heating conductor; and an electric heating temperature control apparatus connected to the electric heating wire, comprising:

a temperature detecting circuit, a heating switching circuit, and
a temperature parameter setting circuit;

wherein the temperature sensing conductor is used for sensing a temperature of the heating conductor, the insulating layer is used for insulation between the temperature sensing conductor and the heating conductor, and the insulating layer changes its resistance or results in a short circuit between the temperature sensing conductor and the heating conductor when a local or overall temperature of the heating conductor changes, and the heating conductor is used for heating, the temperature detecting circuit comprises a temperature sensing voltage dividing and sampling unit, an AC voltage dividing and sampling unit and a differential signal processing unit;

a first terminal of the temperature sensing voltage dividing and sampling unit is connected to a second terminal of the temperature sensing conductor, a first terminal of the temperature sensing conductor is connected to a live wire of an AC power supply, a second terminal of the temperature sensing voltage dividing and sampling unit is grounded, an output terminal of the temperature sensing voltage dividing and sampling unit is connected to the differential signal processing unit, and the temperature sensing voltage dividing and sampling unit is used for converting a signal flowing through the temperature sensing conductor into a temperature voltage signal and output it to the differential signal processing unit;

a first terminal of the AC voltage dividing and sampling unit is connected to the live wire of the AC power supply, a second terminal of the AC voltage dividing and sampling unit is grounded, an output terminal of the AC voltage dividing and sampling unit is connected to the differential signal processing unit, and the AC voltage dividing and sampling unit is used for converting an input signal of the AC power supply into a reference voltage signal and output it to the differential signal processing unit;

the differential signal processing unit is used for performing a differential comparison between the temperature voltage signal and the reference voltage signal and outputting a stop-heating signal or a heating signal according to the differential comparison between the temperature voltage signal and the reference voltage signal;

the heating switching circuit is connected to the temperature detecting circuit and to the heating conductor, and is used for turning off a power supply circuit of the heating conductor when receiving the stop-heating signal, and turning on the power supply circuit of the heating conductor when receiving the heating signal, so as to control the heating conductor to heat or to stop heating; and the temperature parameter setting circuit is connected to the temperature detecting circuit for setting a temperature parameter.

14. The electric heating device according to claim 13, wherein the electric heating temperature control apparatus further comprising:

a safety protection circuit, which is connected to the heating switching circuit and to the heating conductor, wherein the safety protection circuit detects the local or overall temperature of the heating conductor by detecting a leakage current through the insulating layer caused by a change of the resistance of the insulating layer or by the short circuit, and outputs an abnormality signal to control the heating switching circuit to turn off the power supply circuit of the heating conductor when the temperature is higher than a preset safety value.

15. The electric heating device according to claim 14, wherein the heating switching circuit comprises a first switch unit and a second switch unit;

a first terminal of the first switch unit is connected to the live wire of the AC power supply or to the second terminal of the temperature sensing conductor, a second terminal of the first switch unit is connected to a first terminal of the heating conductor, a first terminal of the second switch unit is connected to a second terminal of the heating conductor, and a second terminal of the second switch unit is grounded or equivalently grounded;

when the first switch unit and the second switch unit are on, the power supply circuit of the heating conductor is turned on;

when the first switch unit or the second switch unit is off, the power supply circuit of the heating conductor is turned off; and when the first switch unit and the second switch unit are off, heating currents at both terminals of the heating conductor are cut off.

16. The electric heating device according to claim 14, wherein the safety protection circuit is also used for outputting the abnormality signal in cases where the temperature detecting circuit works abnormally or the heating switching circuit works abnormally, to control the heating switching circuit to turn off the power supply circuit of the heating conductor.

17. The electric heating device according to claim 14, wherein the safety protection circuit comprises a safety signal sampling unit and a safety signal processing unit;

wherein a first terminal of the safety signal sampling unit is connected to a second terminal of the heating conductor, a second terminal of the safety signal sampling unit is grounded or connected to a voltage terminal of a power circuit, and the safety signal sampling unit is used for converting a current signal passing therethrough into a safety voltage signal and output it to the safety signal processing unit;

the safety signal processing unit is connected to the heating switching circuit, and the safety signal processing unit performs abnormality analysis and judgment according to a received abnormality judgment sequence and the safety voltage signal, and outputs an abnormality signal to the heating switching circuit when an abnormality exists; and the heating switching circuit is also connected to the safety signal processing unit, and the heating switching circuit is also used for turning off the power supply circuit of the heating conductor when receiving the abnormality signal.

18. The electric heating device according to claim 13, wherein the heating switching circuit comprises a first switch unit and a second switch unit; and the temperature sensing voltage dividing and sampling unit comprises a first resistor and a second resistor, wherein a first terminal of the first resistor is connected to the second terminal of the temperature sensing conductor directly or through a first diode, a second terminal of the first resistor is connected to a first terminal of the second resistor, a second terminal of the second resistor is grounded, a series connection node of the first resistor and the second resistor serves as the output terminal of the temperature sensing voltage dividing and sampling unit to be connected to the differential signal processing unit;

the AC voltage dividing and sampling unit comprises a third resistor and a fourth resistor, a first terminal of the third resistor is connected to the live wire of the AC power supply directly or through a second diode, a second terminal of the third resistor is connected to a first terminal of the fourth resistor, a second terminal of the fourth resistor is grounded, and a series connection node of the third resistor and the fourth resistor serves as the output terminal of the AC voltage dividing and sampling unit to be connected to the differential signal processing unit; and the first and diodes are connected such that they simultaneously intercept a positive half cycle or a negative half cycle of a voltage of the AC power supply for voltage division and sampling.

19. The electric heating device according to claim 13, wherein the heating switching circuit comprises a first switch unit and a second switch unit; and the temperature sensing voltage dividing and sampling unit comprises a second resistor, wherein a first terminal of the heating conductor is connected to the second terminal of the temperature sensing conductor through the first switch unit, a second terminal of the heating conductor is connected to a first terminal of the second resistor through the second switch unit, a second terminal of the second resistor is grounded, and the first terminal of the second resistor also serves as the output terminal of the temperature sensing voltage dividing and sampling unit to be connected to the differential signal processing unit; and the AC voltage dividing and sampling unit comprises a third resistor and a fourth resistor, a first terminal of the third resistor is connected to the live wire of the AC power supply directly or through a diode, a second terminal of the third resistor is connected to a first terminal of the fourth resistor, a second terminal of the fourth resistor is grounded, and a series connection node of the third resistor and the fourth resistor serves as the output terminal of the AC voltage dividing and sampling unit to be connected to the differential signal processing unit.

20. The electric heating device according to claim 13, wherein the differential signal processing unit comprises a first voltage comparator and a second voltage comparator, wherein a first input terminal of the first voltage comparator is connected to the output terminal of the temperature sensing voltage dividing and sampling unit, a second input terminal of the first voltage comparator is connected to the output terminal of the AC voltage dividing and sampling unit, an output terminal of the first voltage comparator is connected to a second input terminal of the second voltage comparator, a first input terminal of the second voltage comparator is connected to a voltage source, and an output terminal of the second voltage comparator is connected to the heating switching circuit, or the differential signal processing unit comprises a third voltage comparator and a single-chip microcomputer, wherein a first input terminal of the third voltage comparator is connected to the output terminal of the temperature sensing voltage dividing and sampling unit, a second input terminal of the third voltage comparator is connected to the output terminal of the AC voltage dividing and sampling unit, an output terminal of the third voltage comparator is connected to the single-chip microcomputer, and the single-chip microcomputer is also connected to the heating switching circuit, or the differential signal processing unit comprises a single-chip microcomputer, wherein the output terminal of the temperature sensing voltage dividing and sampling unit is connected to a first A/D converter port of the single-chip microcomputer, the output terminal of the AC voltage dividing and sampling unit is connected to a second A/D converter port of the single-chip microcomputer, and the single-chip microcomputer is also connected to the heating switching circuit.

* * * * *